UNITED STATES PATENT OFFICE.

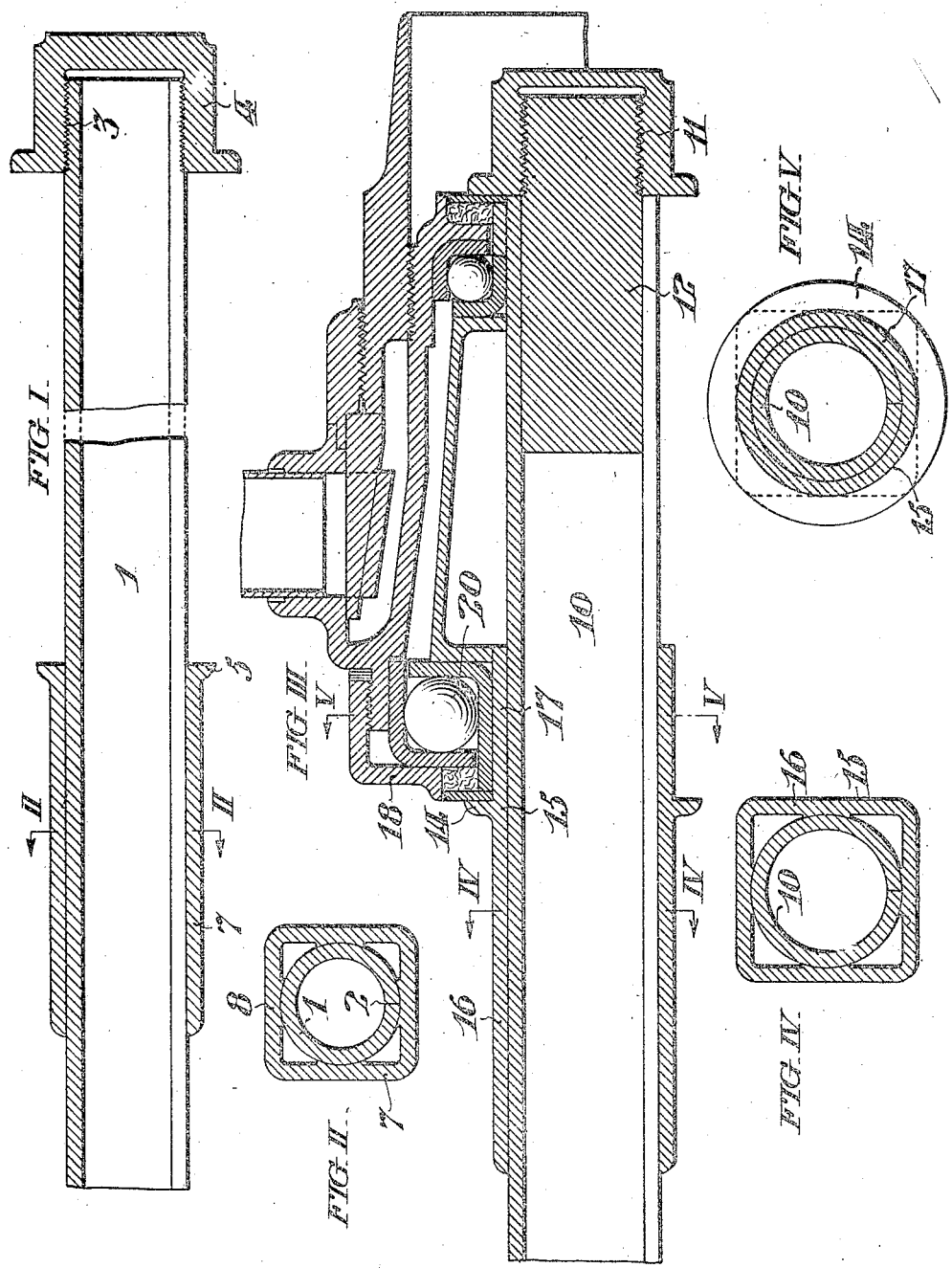

THOMAS H. WALBRIDGE, OF TOLEDO, OHIO.

AXLE.

No. 925,537.

Specification of Letters Patent.

Patented June 22, 1909.

Application filed October 29, 1906. Serial No. 340,975.

*To all whom it may concern:*

Be it known that I, THOMAS H. WALBRIDGE, of Toledo, Ohio, have invented a certain new and useful Improvement in Axles, whereof the following is a specification, reference being had to the accompanying drawings.

My improvement is particularly applicable to axles of the type employed in carriages, wagons, automobiles and similar vehicles, wherein the vehicle supporting wheels are rotated independently of the axles which are prevented from rotating by connection with the vehicle body.

It is an object of my invention to provide an axle which may be constructed of commercial metal shapes, and, the form of my invention hereinafter described comprises an axle formed of a commercial metal tube of circular cross section provided with screw threads at its ends, and abutments for the wheels carried by respective sleeves of polygonal cross section which are rigidly secured on said tube and which form seats for respective spring connection with the vehicle body.

As hereinafter described, I find it convenient to form the screw threads at the ends of the axle upon metal plugs which are rigidly secured therein, and to provide said sleeves with circular portions concentric with the axle tube and extending outwardly beyond the wheel abutments so as to reinforce the axle within the wheels.

My invention comprises the various novel features of construction and arrangement hereinafter more definitely specified.

In the drawings, Figure I, is a longitudinal sectional view of an axle conveniently embodying my improvement. Fig. II, is a transverse sectional view of said axle, taken on the line II, II, in Fig. I. Fig. III, is a sectional view similar to Fig. I, but showing a modified form of axle with a hub applied thereto. Fig. IV, is a transverse sectional view of the axle, taken on the line IV, IV, in Fig. III. Fig. V, is a transverse sectional view of the axle taken on the line V, V, in Fig. III.

Referring to Figs. I and II; the axle comprises the structural metal tube 1, which is conveniently formed of a strip of sheet steel bent in cylindrical form with its opposite edges meeting as indicated at 2 in Fig. II. Said edges may be welded, brazed or otherwise joined. Said tube 1, is provided at each end with a screw thread 3, to engage a wheel retaining nut 4, and a flange abutment 5, which respectively determine the position of the wheels on the axle. As shown said flange 5, is formed in unitary relation with the sleeve 7, which is rigidly secured on said tube 1, and is preferably seamless as indicated in Fig. II. As indicated in Fig. II, said sleeve 7, is rectangular in cross section and its upper wall 8, forms a seat for the spring connection between the axle and the vehicle body.

In the form of my invention shown in Figs. III and IV; the axle comprises the tube 10, which is similar to the tube 1, shown in Figs. I and II, but the screw thread 11, at the end thereof is conveniently formed on the plug 12, which fits within said tube and is rigidly connected therewith. Said plug 12 may be welded within the tube 10, or the latter may be expanded, by heat, and shrunk upon said plug.

The abutment 14, which determines the location of the wheel in Fig. III, is a flange projecting transversely with respect to the axle in unitary relation with the sleeve 15. Said sleeve 15, is of polygonal cross section at its portion 16, extending inwardly from said flange 14, as indicated in Fig. IV, but its portion 17, extending outwardly from said flange 14, is of circular cross section as indicated in Fig. V, and fits within the wheel hub 18, so as to reinforce the axle where it supports the bearing balls 20, in addition to affording a seat for the spring connections between the axle and the vehicle.

Although I find it convenient to form said sleeves 7 and 15 of rectangular tubes, it is to be understood that they may be formed of tubes of other polygonal cross section, capable of affording a suitable seat for the spring connections.

I do not desire to limit myself to the specific details of construction above described, as it is obvious that various modifications may be made therein without departing from the scope of the following claims.

I claim:—

1. A vehicle axle formed of a split cylindrical metal tube provided with screw threads at its opposite ends; seamless sleeves secured on said tube forming wheel abutments and seats for spring connections; said sleeves being of uniform internal diameter, but circular at one end, and polygonal at the other; and, radially projecting circumferential flanges at the junctions of the cylindrical and polygonal portions of said sleeves, substantially as set forth.

2. A vehicle axle formed of a split cylindrical metal tube; seamless sleeves secured on said tube forming wheel abutments and seats for spring connections; said sleeves being of uniform internal diameter but circular at one end, and polygonal at the other; and, radially projecting circumferential flanges at the junctions of the cylindrical and polygonal portions of said sleeves, substantially as set forth.

3. A vehicle axle formed of a cylindrical metal tube, provided with screw threads at its opposite ends; seamless sleeves secured on said tube forming wheel abutments and seats for spring connections; said sleeves being of uniform internal diameter but circular at one end, and polygonal at the other; and, radially projecting circumferential flanges at the junctions of the cylindrical and polygonal portions of said sleeves, substantially as set forth.

In testimony whereof, I have hereunto signed my name at Toledo, Ohio, this seventeenth day of October 1906.

THOMAS H. WALBRIDGE.

Witnesses:
A. C. VAN DRIESEN,
A. VAN WONNER.